(12) United States Patent
Jodlauk et al.

(10) Patent No.: US 9,509,762 B2
(45) Date of Patent: Nov. 29, 2016

(54) METHOD OF PROVIDING DATA TO A CLIENT

(71) Applicant: Telefonaktiebolaget L M Ericsson (publ), Stockholm (SE)

(72) Inventors: Gordian Jodlauk, Würselen (DE); Guido Gehlen, Neuss (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 332 days.

(21) Appl. No.: 14/215,828

(22) Filed: Mar. 17, 2014

(65) Prior Publication Data

US 2014/0201336 A1    Jul. 17, 2014

Related U.S. Application Data

(62) Division of application No. 13/128,251, filed as application No. PCT/EP2008/065199 on Nov. 10, 2008, now Pat. No. 8,694,678.

(51) Int. Cl.

| G06F 15/16 | (2006.01) |
|---|---|
| H04L 29/08 | (2006.01) |
| H04N 21/235 | (2011.01) |
| H04N 21/236 | (2011.01) |
| H04N 21/262 | (2011.01) |
| H04N 21/434 | (2011.01) |
| H04N 21/435 | (2011.01) |
| H04H 20/16 | (2008.01) |
| G06F 12/00 | (2006.01) |

(52) U.S. Cl.
CPC ............. *H04L 67/10* (2013.01); *H04H 20/16* (2013.01); *H04L 29/08072* (2013.01); *H04N 21/235* (2013.01); *H04N 21/23617* (2013.01); *H04N 21/26266* (2013.01); *H04N 21/434* (2013.01); *H04N 21/435* (2013.01); *H04N 21/4349* (2013.01)

(58) Field of Classification Search
USPC .................. 709/203, 217–219, 223–229, 250
See application file for complete search history.

(56) References Cited

U.S. PATENT DOCUMENTS

| 5,805,825 | A  | 9/1998  | Danneels et al. |
|---|---|---|---|
| 5,809,278 | A  | 9/1998  | Watanabe |
| 6,714,532 | B1 | 3/2004  | Kawaguchi |
| 7,093,000 | B1 | 8/2006  | Yamagishi et al. |
| 7,650,430 | B2 | 1/2010  | Amonou et al. |
| 7,839,864 | B1 | 11/2010 | Satrawla et al. |
| 2002/0024961 | A1 | 2/2002  | Sestito et al. |
| 2003/0002515 | A1 | 1/2003  | Crinon et al. |
| 2003/0196202 | A1 | 10/2003 | Barrett et al. |
| 2005/0036444 | A1 | 2/2005  | Park et al. |
| 2006/0193256 | A1 | 8/2006  | Burns et al. |

(Continued)

FOREIGN PATENT DOCUMENTS

| EP | 0957597 A2 | 11/1999 | |
|---|---|---|---|
| EP | 1022909 | * 7/2000 | ............... H04N 7/24 |

(Continued)

*Primary Examiner* — Zarni Maung
(74) *Attorney, Agent, or Firm* — Coats & Bennett, PLLC

(57) ABSTRACT

A method provides data to a client by a server and comprises receiving a data update; sending a duplicate of the data update to the client; incorporating the data update into a revolving data carousel for holding the data, the data comprising a plurality of data items; and sending a data item on the data carousel to the client.

20 Claims, 11 Drawing Sheets

(56) References Cited

U.S. PATENT DOCUMENTS

| | | | |
|---|---|---|---|
| 2007/0011422 A1* | 1/2007 | Srinivasan | G06F 17/30244 711/165 |
| 2007/0104213 A1 | 5/2007 | Akamatsu | |
| 2008/0074996 A1 | 3/2008 | Fourcand | |
| 2008/0263341 A1 | 10/2008 | Ozer et al. | |
| 2009/0016217 A1 | 1/2009 | Kashyap | |
| 2010/0226392 A1 | 9/2010 | Lee et al. | |

FOREIGN PATENT DOCUMENTS

| | | |
|---|---|---|
| EP | 1022909 A1 | 7/2000 |
| EP | 1122950 A2 | 8/2001 |
| JP | 2000031921 A | 1/2000 |
| JP | 2000032423 A | 1/2000 |
| JP | 2001016295 A | 1/2001 |
| JP | 2001298678 A | 10/2001 |
| JP | 2002051022 A | 2/2002 |
| JP | 2002064446 A | 2/2002 |
| JP | 2002368707 A | 12/2002 |
| JP | 2003018112 A | 1/2003 |
| JP | 2003143089 A | 5/2003 |
| JP | 2005130495 A | 5/2005 |
| JP | 2005197992 A | 7/2005 |
| JP | 2005252919 A | 9/2005 |
| JP | 2006050316 A | 2/2006 |
| WO | 00/62547 A1 | 10/2000 |
| WO | 2006006219 A1 | 1/2006 |

* cited by examiner

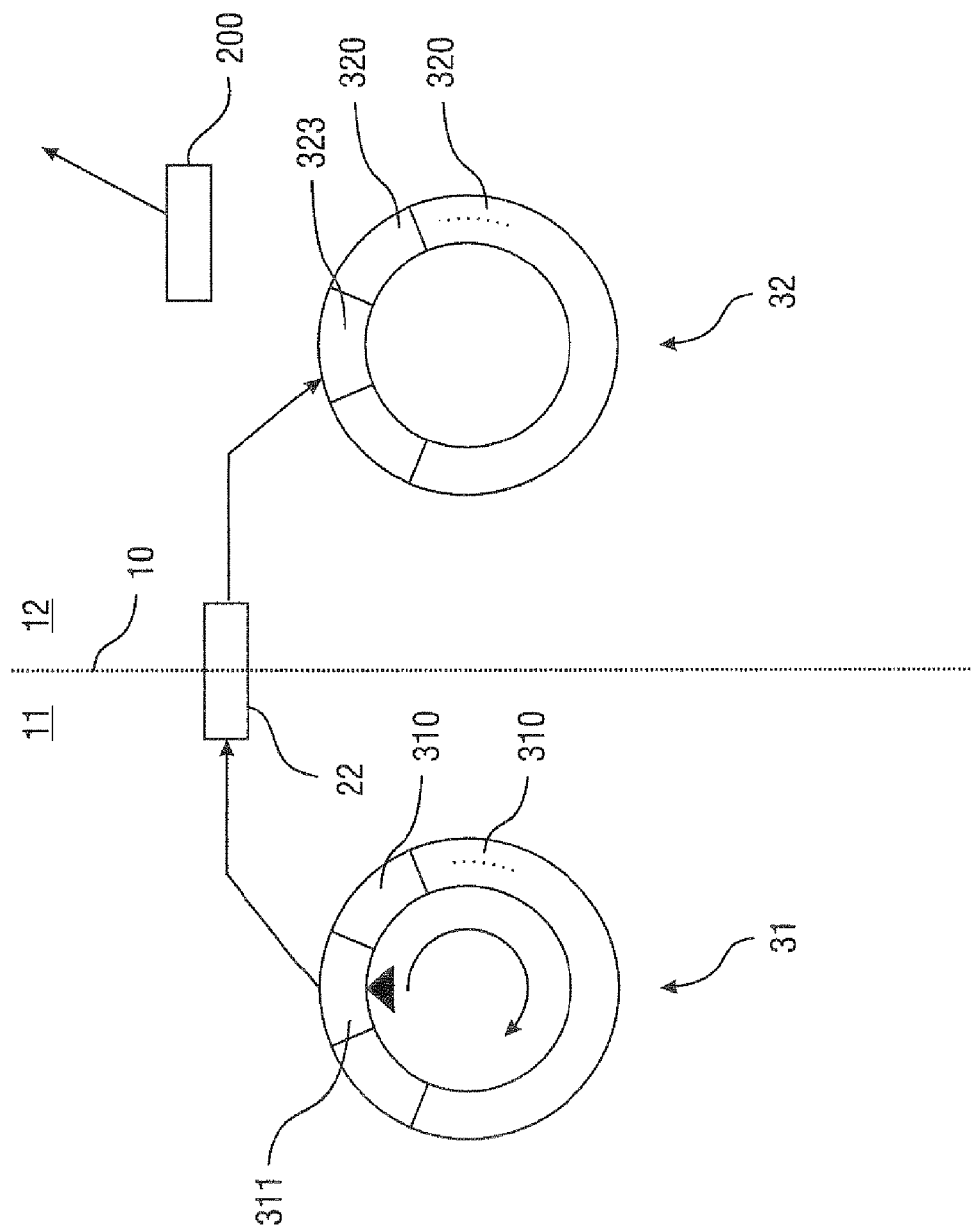

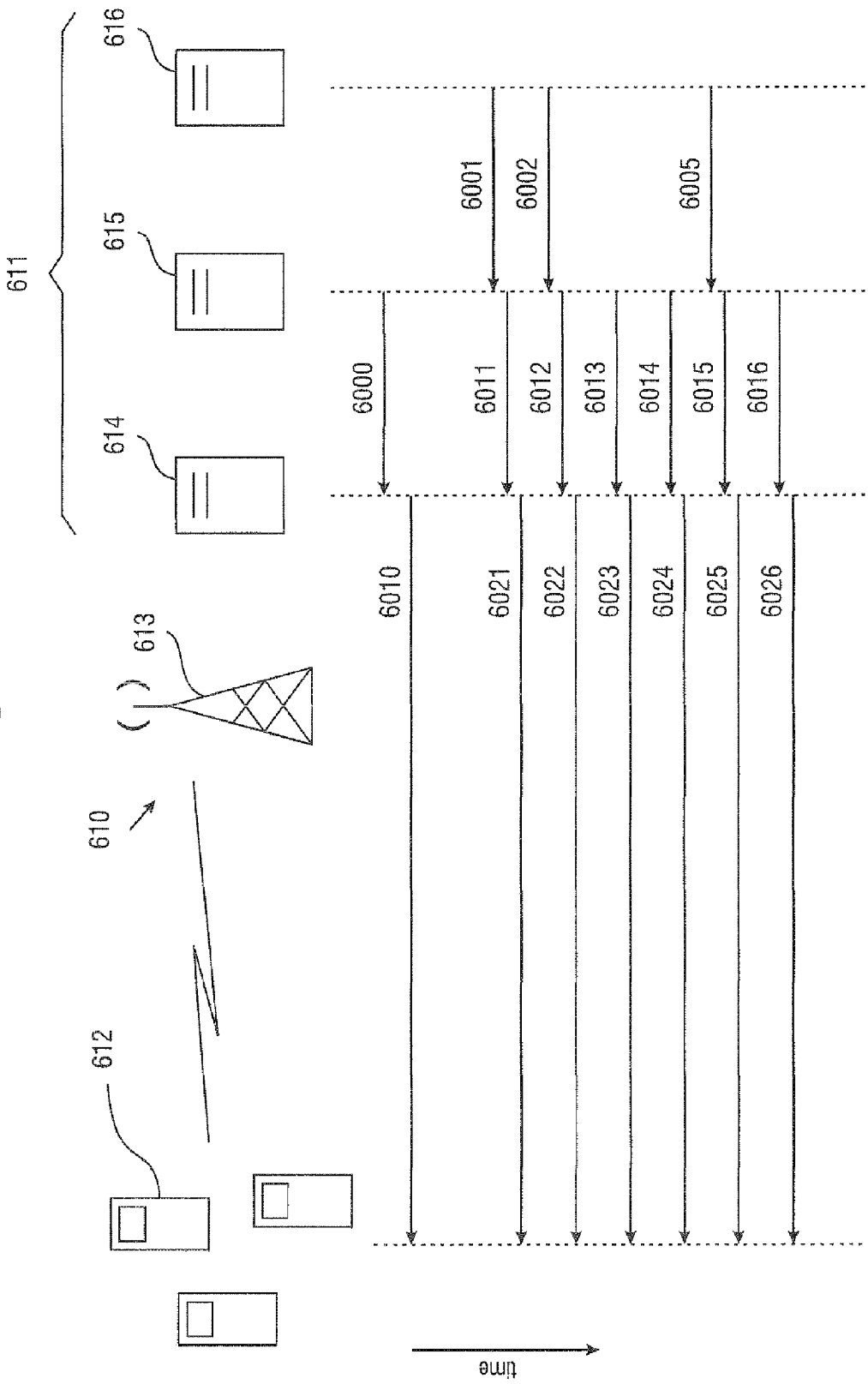

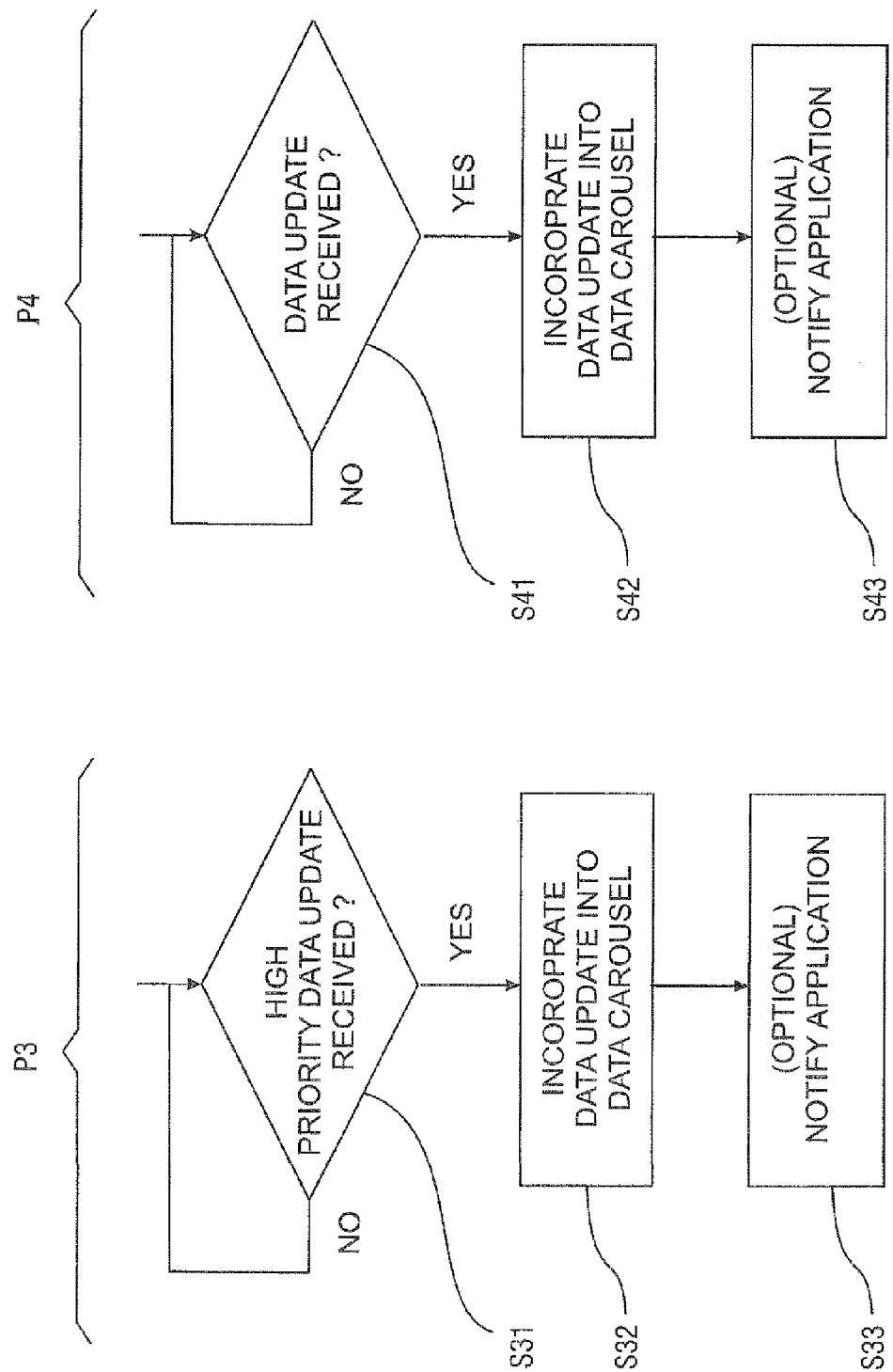

METHOD OF PROVIDING DATA TO A CLIENT

RELATED APPLICATIONS

The present application is a divisional of prior U.S. patent application Ser. No. 13/128,251, filed Sep. 23, 2011, which is a National Stage application claiming priority from PCT/EP2008/065199, filed Nov. 10, 2008, the disclosure of each of which are incorporated herein by reference in their entirety.

TECHNICAL FIELD

The invention relates to a method of providing data to a client by a server. The invention also relates to a method of receiving data from a server by a client. The invention further relates to a server entity providing data to a client as well as to a client entity receiving data from a server.

BACKGROUND

In classical synchronous communication systems data flow is usually bidirectional and also connection oriented. Therefore, in such synchronous systems it is possible to exchange an arbitrary number of acknowledgements for maintaining and ensuring communication reliability. In other words, data being sent to a client by a server is acknowledged by the client by sending corresponding acknowledgement data back to the server over the synchronous communication system. The server is, as a consequence, able to determine whether or not the sent data has reached the client correctly and whether or not a resending of data to one or more clients needs to be initiated.

However, when the number of clients which are served by the server becomes large, such systems do not scale well and a reliable exchange of data becomes impractical: the required data transfer associated with sending the acknowledgements from each client for each data sending operation may quickly exhaust both processing resources and network bandwidth of such a communication system. Further, conventional communication systems that provide data to a plurality of clients by a server usually lack a backward channel (uplink), i.e. a communication channel from the client to the server. Those systems are usually referred to as being asynchronous communication systems.

Nevertheless, there is a need to provide reliable communication also in the case of asynchronous and/or asymmetric communication systems. One conventional concept is to store data in a so called data carousel which comprises a number of data slots storing data items. Such a carousel revolves in time, i. e. one of the slots is being identified as a current slot for a specific period of time. The data item being stored in that current slot is sent (broadcast) to all clients, before a next data slot of the data carousel is being made the current data slot. Once data items of all slots have been broadcast to the clients, revolving the data carousel is repeated from a start position. As a consequence, every data item is sent repeatedly, and a client having missed one transmission of a specific data item may receive this item at an instance of a repeated sending. In this way, it can be ensured that a maximum number of clients is reached by the server and said clients are able to receive all or a maximum number of data items. Further, new clients may join the communication system without actively interacting with the server.

On the server side, such a communication system involves running the data carousel and receiving so-called data updates that need to be incorporated into the carousel, this at a specific data slot of the carousel. Such an incorporating may include modifying, adding, or removing of the data item being stored in the specific data slot of the carousel.

On the client side, such a communication system may involve running a client side data carousel, receiving update messages from the server that correspond to one data item of the server side data carousel, and incorporating said update message into the client side carousel. All successfully received messages may form a more and more complete copy of the server side carousel on the client side.

However, there may be a substantial delay from an instance when a data update is received at the server side, the data update is being incorporated into the server side carousel, and, eventually, the server side carousel has revolved such that the data item associated with the above data update is sent to the clients. Such a delay may easily outlast a so-called time to live (TTL) of a data item which specifies a time span after which the item becomes obsolete. In addition to this, it may occur a further data update to the specific data item before it has been sent to the clients, such that the clients never become aware of the information being associated with the preceding data update. Finally, a revolution time of the carousel, which may be proportional to a total number of data slots being held by the carousel, may unacceptable long if a given quality of service is to be maintained.

Nevertheless, such delays and such inconsistencies may be unacceptable for a broad range of applications. Therefore, a more reliable and faster broadcast mechanism may be required.

In addition to the above, there is known an information server and a method of arranging carousel information from EP 1 022 909 A1. The respective teaching considers immediate insertion of particular files into the carousel.

SUMMARY

It is an object of the present invention to provide an improved method of providing data to a client by a server. It is a further object of the present invention to provide an improved method of receiving data from a server by a client. It is a further object of the present invention to provide an improved server entity providing data to a client. It is yet another object of the present invention to provide an improved client entity receiving data from a server.

The above-mentioned problems are solved by the subject-matter of the independent claims. Further preferred embodiments are defined in the dependent claims.

According to a first aspect of the present invention, a method of providing data to a client by a server is provided, wherein the method comprises receiving a data update; sending a duplicate of the data update to the client; incorporating data update into a revolving data carousel for holding the data, the data comprising a plurality of data items; and sending a data item on the data carousel to the client.

According to a second aspect of the present invention, a method of receiving data from a server by a client is provided, wherein the method comprises receiving a data update; determining whether or not the received data update is a high priority data update; and incorporating the received data update into a data carousel for holding the data which comprises a plurality of data items, wherein incorporating of a high priority data update is conducted prior to the incorporating of a non high priority data update.

According to a third aspect of the present invention, a server entity providing data to a client is provided, which comprises an access interface being adapted to receive a data update; a data carousel section being adapted to hold data in a revolving data carousel and to incorporate the data update into the revolving data carousel, wherein the data comprises a plurality of data items; a duplicating section being adapted to send a duplicate of the data update to the client; and an output interface being adapted to send a data item on the data carousel to the client.

According to a fourth aspect of the present invention, a client entity receiving data from a server is provided, which comprises an input interface receiving a data update; a carousel section being adapted to hold data in a data carousel which comprises a plurality of data items, being adapted to incorporate a received data update into the data carousel, and being adapted to determine whether or not a received data update is a high priority data update, wherein incorporating of a high priority data update is conducted prior to the incorporating of a non high priority data update.

According to a fifth aspect of the present invention a computer program is provided which is executable on a data processing apparatus and is adapted to implement a method according to the first aspect of the present invention or a method according to the second aspect of the present invention.

According to a sixth aspect of the present invention a communication system is provided which comprises a server entity and at least one client entity. The server entity provides data to the client entity and comprises an access interface being adapted to receive a data update; a data carousel section being adapted to hold data in a revolving data carousel and to incorporate the data update into the revolving data carousel, wherein the data comprises a plurality of data items; a duplicating section being adapted to send a duplicate of the data update to the client entity; and an output interface being adapted to send a data item on the data carousel to the client entity, and the client entity receives data from the server entity and comprises an input interface receiving the data update and a carousel section being adapted to hold data in a data carousel which comprises a plurality of data items, being adapted to incorporate a received data update into the data carousel, and being adapted to determine whether or not a received data update is a high priority data update, wherein incorporating of a high priority data update is conducted prior to the incorporating of a non high priority data update.

Accordingly, the data items are sent on a first communication channel and the duplicate of the data update is sent on a second communication channel. Also, the non-high priority data update is received over a first communication channel and the high priority data update is received over a second communication channel.

Various embodiments of the present invention may provide particular advantages for an improved method of providing data to a client by a server, for an improved method of receiving data from a server by a client, for an improved server entity providing data to a client, for an improved client entity receiving data from a server, and for an improved computer program implementing a method of providing data to a client by a server or a method of receiving data from a server by a client. Particularly, an update of a client side data carousel may be accelerated and, for example, high priority data updates may be passed to clients with least possible delay.

BRIEF DESCRIPTION OF THE FIGURES

The above recited features of the present invention will be better understood from the following description taken in conjunction with the accompanying drawings. It is to be noted, however, that the accompanying drawings illustrate only typical embodiments of the present invention, and are, therefore, not to be considered limiting of the scope of the invention.

FIGS. 1A and 1B show schematic views of a communication system at two distinct instances according to an embodiment of the present invention;

FIG. 6 shows a schematic view of providing data to clients by a server, according to another embodiment of the present invention;

FIG. 7B shows a schematic flowchart of a method of receiving data from a server by a client, according to yet another embodiment of the present invention.

DETAILED DESCRIPTION OF THE EMBODIMENTS

Figure 1A:
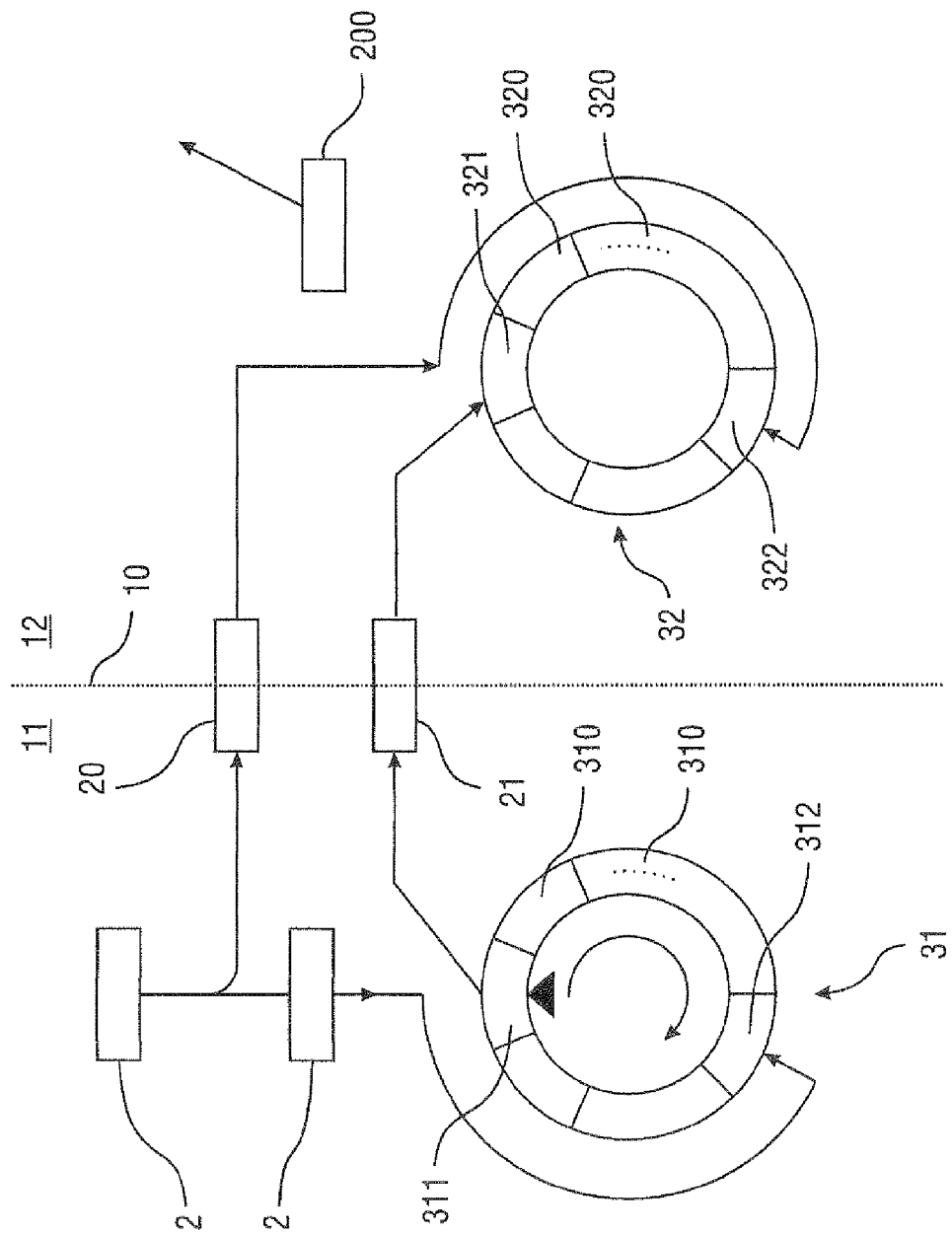

In the context of an embodiment of the present invention, clients and servers may be any entities exchanging data via a communication network; hence they may be also part of a communication system. In the case of an asynchronous communication system, a server may be an entity which is able to send data over a communication network to one client or a plurality thereof, whereas a client may be an entity which is able to receive such data from said server. Examples for such servers or server entities may be data processing apparatuses, computers, server hardware, or software modules running on one data processing apparatus or distributed on more than one data processing apparatus. Whereas, common examples for client entities include mobile terminals, mobile phones, car navigation systems, onboard navigational devices, handheld navigational systems, car radio equipment, or wireless network adapters for personal computers (PC).

A respective asynchronous communication network may provide full downlink communication from the server to the clients, whereas only a limited backward uplink channel from a client to the server is provided—limited with respect to a bandwidth or data transmission rate of the downlink channel. As an extreme, an asynchronous communication network may well omit an uplink channel at all, and, as a consequence, clients are not able to send data, particularly acknowledgement messages, to the server. Nevertheless, an asynchronous communication network may yet provide full uplink communication as well. However, the use of such uplink capacity may be restricted and/or reserved for other applications. For example, in the case that there is a large number of clients, using the uplink capacity for sending data acknowledgement messages from each client to the server may quickly result in exhaustion of the entire uplink capacity.

Common examples for asynchronous communication networks are the so called asynchronous digital subscriber line (ADSL, DSL) network, television broadcast networks, the teletext page network thereof, radio data system (RDS) or traffic message channel (TMC) networks over radio broadcasts, transport protocol expert group (TPEG) networks over digital video broadcasting (DVB) or digital audio broadcasting (DAB), and also recently evolved broadcast networks which are imbedded in superordinate communication networks, such as a global system for mobile communications (GSM) network, a personal communication services (PCS) network, a code division multiple access (CDMA) network, a long term evolution (LTE) network, or a universal mobile communication system (UMTS) network. The latter mentioned cellular communication networks may particularly provide a so-called multimedia broadcast multicast service (MBMS) that, in turn, provides asynchronous communication from a server to a plurality of clients. In general, a communication network is seen in the context of the present invention as an entity that provides data exchange or transmission at least from a server to a client.

A data update may be generated by a server side application and may include a data item that is to be added to a data slot of a data carousel, a data item that is to update an existing data item already being stored on a slot, or a data item that instruct the removal of a data item and/or the associated data slot of the carousel. When a data update is associated with adding a data item to the carousel this may involve the adding of a new data slot to the carousel, hence also with an expanding of the overall number of data slots of the data carousel. On the other hand, however, the deleting of a data item from the data carousel may as well involve the removal of a data slot from the carousel, hence resulting in a contracting of the data carousel and a diminishing of the number of present data slots. In general, each data update may comprise a TTL and/or a data identifier.

Further, a sending of a duplicate of the data update to the client may comprise a duplicating of the data update realized in various ways. Examples include buffering a received data update in a memory and a subsequent multiple readout of this memory, writing the received data update to two or more distinct memories and respective readouts from said memories, repeated forwarding of the data update to different target addresses, and also a hardwired bifurcation which provides signals associated with the data update to multiple target inputs. Generally, it is noted that a duplicate of the data update and the date update itself may be completely indistinguishable and exchangeable entities, i. e. a duplicate of the data update may also be referred to as a data update. Further, the data update duplicate may be identical to the originator data update.

Next, the incorporating of the data update into the revolving data carousel may comprise a determining of a respective target data of the carousel. This may also be conducted on the basis of the data update itself, since the update may comprise information such as an identifier or a TTL which may affect the determining of a respective slot. In other words, the data update and a data item may comprise information which enables a unique assignment of a data update to a corresponding data item of the data carousel, and vice versa. Usually, such unique assignment may be carried out by means of identifiers, pointers, addresses, and/or indicator values which can easily be compared in order to achieve unique assignment.

Furthermore, incorporating the data update may as well include adding or removing data slots to or from the date carousel and, as a result, changing the number of data slots of the data carousel. Incorporating the data update may as well be realized by storing the data update until the respective target data slot of the data carousel becomes the current data slot. Further, the removal of expired items from the carousel may be conducted with each revolution of the carousel. In this way, additional computational resources may be released, since an actual update of the data carousel is only required before or when the corresponding data item stored in the current data slot of the data carousel is to be sent to the clients.

In addition to the above, the method comprises sending a data item on the data carousel to the client. This may include sending each data item at least once every revolution of the data carousel to the clients. However, a data item may have become obsolete—or is removed—before the data slot in which that data item is being stored becomes the current slot and the respective data item would have been sent to the clients. In this case, not all data items on the carousel are necessarily sent to the client. It is noted, that an obsolete data item in this context may be an item which has an expired TTL, and hence it may be blocked from sending. In general, since each data item on the data carousel is subject to change or deletion by a corresponding data update or by the provision with a TTL, it may well occur that a data update is never passed to the clients, if the sending of the data update to the clients is omitted. Nevertheless, every data item which is still part of the data carousel at a specific instance is sent to the clients.

However, the clients are still provided with the obsolete data item, since the data update associated with updating or adding the data item, which usually occurs prior to an expiry of the TTL or a data update that instructs a removal of the respective data item, has already been sent to the clients. In this way, it may be ensured that a data update reaches a maximum number of clients and this with a minimum delay only being determined by the actual transmission delay being required for sending the data updates to the client. Furthermore, by means of a sending of a duplicate of the data update to the client, a loss of data, unsatisfactory reliability, and an unacceptable delay between an instance at which a data update is present on the server side and a respective arrival of an associated data item at the client side may be well avoided.

FIG. 1A shows a schematic view of a communication system at a first instance according to an embodiment of the present invention. The communication system comprises a server side 11, at least one client side 12, and a communication network 10 which links the server side 11 to the client side 12. The server side 11 may comprise a server entity, whereas the client side 12 may comprise one or more client entities.

On the server side 11 there is arranged a server side data carousel 31 which comprises a number of data slots 310 which store data items. The actual number of data slots 310 of the data carousel 31 may be either fixed or may as well vary over time, such to adapt to an actual number of data items which are to be stored by the data carousel 31. For example, when a new data item is to be stored by the data carousel 31 the actual number of data slots 311 may be increased by one, as well as, when a specific data item is no longer being stored by the data carousel 31, the actual number of data slots 311 may be decreased by one.

The data carousel 31 revolves in time such that there is always a current data slot 311. Said current data slot 311 may be selected from the plurality of data slots 310 by means of, for example, setting a pointer value. Revolving may then be attained by changing this pointer value each time a predetermined time span has elapsed. Said changing may be attained by increasing the pointer value, hence making an adjacent data slot which is adjacent to the current data slot 311 the next current data slot at a later instance. Once the pointer exceeds a maximum number, the pointer may be reset and revolving of the data carousel restarts. The data carousel, in general, may be realized as a carousel database or a list.

Said predetermined time span may further be constant as well as it may be varied in time, since, for example, said time span may be adapted to the overall number of data slots 310 being comprised by the data carousel 31. As an example, the time span may be decreased when the data carousel 31 comprises a large number of data slots 310 in order to accelerate data carousel revolution and accelerating data transmission.

On the client side 12 there is arranged a client side data carousel 32. Said data carousel 32 comprises a number of data slots 320 and may also comprise a recent data slot 321. However, it is not required that the data carousel 32 revolves in time, such that there is always one of the data slots 320 being identified as a current data slot 321.

At the shown instance, a data update 2 is being provided on the server side 11. This data update 2 is incorporated at the server side 11 into the data carousel 31 at a corresponding target data slot 312. Such an incorporating may include either a determining of the corresponding data slot 312 to which the data update 2 applies and/or a buffering of the data update 2, until the respective data slot 312 to which the data update 2 applies becomes the current data slot 311. Anyways, the data update 2 is eventually incorporated into the data carousel 31 and may result in writing a data item being contained by the data update 2 to a data slot 310 to the data carousel 31, in updating a data item being already stored in one of the data slots 310 of the data carousel 31, or in removing the data item being stored in a respective data slot of the data carousel 31. The former adding may further comprise an adding of a data slot to the carousel 31, whereas the latter removing may comprise a removing of a respective data slot 310 from the data carousel 31.

At each instance when a data slot 310 of the server side data carousel 31 becomes the current data slot 311, the data item being stored in the current data slot 311 is sent as an update message 21 via the communication network 10 to the client side 12. Such sending may comprise a packaging of the respective data item into the update message 21 is suitable for being transmitted over the communication network 10. On the client side 12, a received message 21 is incorporated into the client side data carousel 32. Such an incorporating may comprise determining a respective position of the client side data carousel 32, i.e. a determining of a respective data slot 322 of the plurality of data slots 320 of the client side data carousel 32. This message 21 may, again, result in adding, modifying, or deleting a data item and/or an associated data slot 320 of the data carousel 32.

The arrival of the message 21 at the client side 12 and/or the incorporation of the message 21 into the data carousel 32 may initiate a release of a notification 200 on the client side 12. Such a notification 200 may well include the respective data item itself, and may be provided such to notify applications being run on the client side 12, such that said applications are aware of the arrival of the message 21 and/or an updated data carousel 32.

According to this embodiment of the present invention, the data update 2 being provided on the server side 11 is immediately and independently from the data carousel 31 being sent to the client side 12 via the communication network 10. Such an immediate sending may realize a somewhat isochronous data transfer from the application on the server side 12 to the client side 11. This by means of an update message 20 that comprises the update 2 or a duplicate thereof, and which is suitable for being transmitted over the communication network 10. Further, the data update 2 may be intercepted before its incorporation into the data carousel 31 for duplicating and/or forwarding as the update message 20 to the client side 12.

The update message 20 being received at the client side 12 may as well be incorporated immediately into the data carousel 32 of the client side 12. Further, this incorporating may again initiate a sending of a notification 200 and an associated notification of arrival of an update message to concerned applications on the server side 12. In this way, the update 2 being provided on the server side 11 is being provided to the client side 12 with a minimum delay, said delay being as short as the time being required to generate and send a corresponding update message 20 over the communication network 10 to the client side 12. In this way, the update 2 may be incorporated into the client side carousel 32 prior to the arrival of a corresponding update message 22 (see FIG. 1B). Anyways, by incorporating the received update messages 20 into the client side carousel 32, a nearly isochronous construction of the client side carousel 32 with respect to the server side carousel 31, only delayed by the transmission time, may be achieved. As a consequence, the update messages 20 may become the primary source for constructing and updating the client side data carousel 32.

According to a further embodiment, a data update 2 is judged whether it is time-critical or not. A time-critical data update may be distinguished from a non-critical data update in a way that a critical data update may become obsolete during the total revolution time of the carousel 31. Further, a data update 2 may be categorized as critical by an application that originates the update, e. g. an application that generates traffic alert messages and data updates on the basis of such alert messages. The sending of the data update 2 to the client side 12 may thus be rendered dependent on a critical status of an update. In other words, a non-critical data update 2 may well only be incorporated into the data carousel 31 and sent to the client 12 at a later instance, when the respective data slot 310 becomes current. Further, a scheduling mechanism may be present for conducting said judging.

FIG. 1B shows the communication system of the above embodiment of the present invention at a later instance. There, it is shown the communication system at an instance when the data slot 312 of the server side data carousel 31 has become the current data slot 311. Since the data update 2 as being described in conjunction with FIG. 1A has already applied to the data slot 312 at this instance, an update message 22 comprising the data item being stored in the current data slot 311 considers the data update 2.

Said update message 22 is received at the client side 12 and may be, again, incorporated into the client side data carousel 32. This may be for purposes of providing a redundant update of the client side data carousel 32 or for additionally enhancing reliability. However, at the client side 12, there may be provided means for deciding whether a repeated incorporation of the update message 22 into the data carousel 32 needs still to be carried out, since the data carousel 32 may already incorporate the update message 21 (cf. FIG. 1A). However, the incorporation of the update message 22 may, again, initiate a notification 200.

Figure 2A:
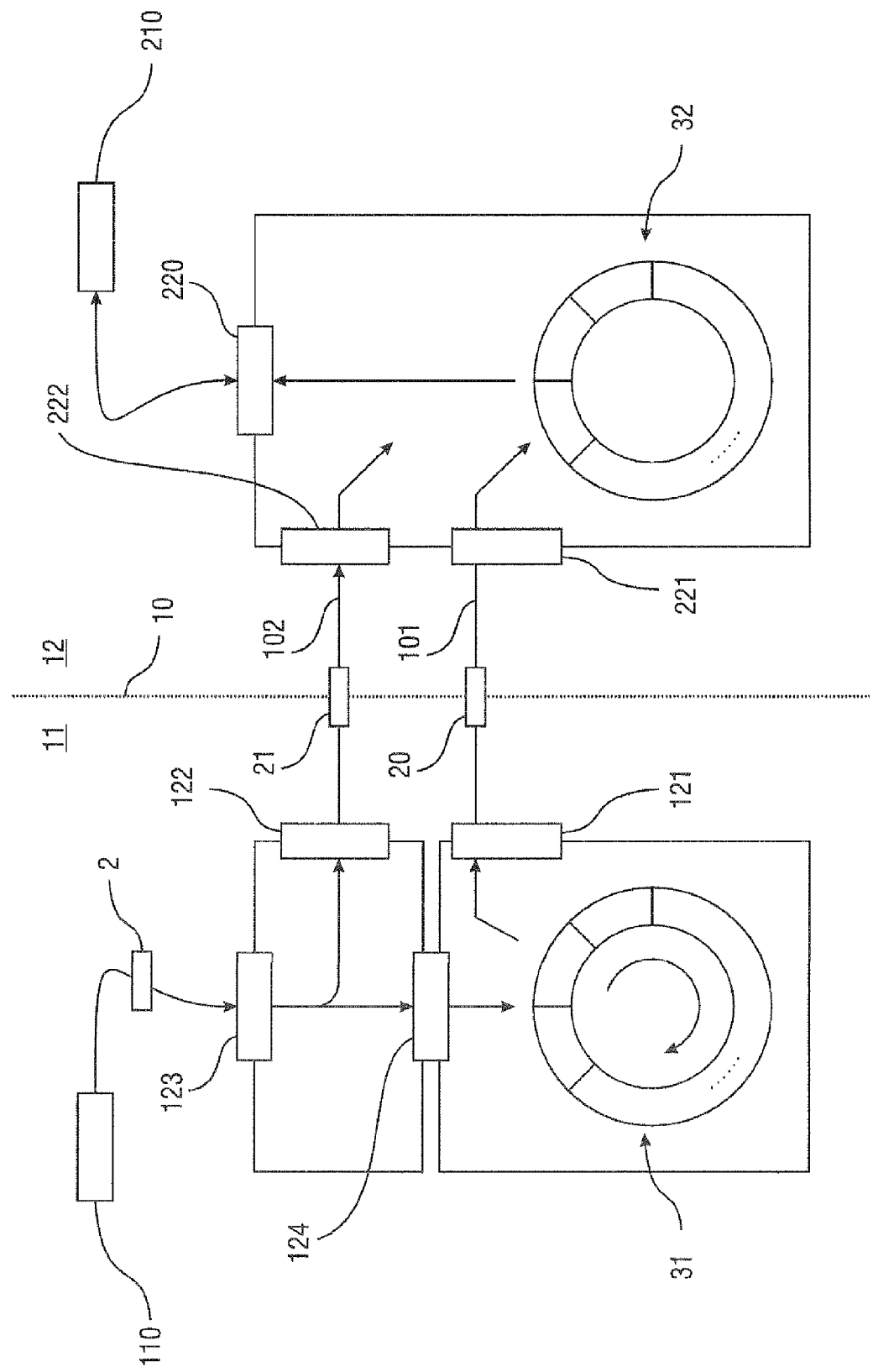
FIGS. 2A through 2C show schematic views of communication systems that comprise a server and a client according to other embodiments of the present invention.

FIG. 2A shows a schematic view of a communication system according to another embodiment of the present invention. There, corresponding elements which have already been described in conjunction with an embodiment of the present invention are marked by identical reference numerals.

On the server side 11, an application 110 may generate the data update 2 and provide the data update 2 to a server access interface 123. After the server access interface 123, the data update 2 is duplicated for providing the data update 2 to a further server access interface 124 and a second output interface 122. The data update 2 after the further access interface 124 is incorporated into the server side data carousel 31 as described in conjunction with an embodiment of the present invention. Thus, in a way, the data update 2 is intercepted before the an invocation of the further server access interface 124, such that the server access interface 123 appears to be transparent to the further interface 124 and the further server access interface 124 may form a shadowed server access interface being invoked by the application 110.

The data item being stored in the current data slot of the data carousel 31 is sent to the client side 12. For this purpose, said data item is packed into the update message 20 which is suitable for being transmitted over a first channel 101 of the communication network 10. Said packing may be effected by the a first output interface 121 and may comprise packing the data item into a suitable protocol. The update message 20 is received on the client side 12 by a first input interface 221 and is subsequently incorporated into the client side data carousel 32.

The data update 2 is, however, also immediately and independent from incorporation into the data carousel 31 sent to the client side 12. This by means of packing the data update 2 into a further update message 21, which is sent over a second communication channel 102 of the communication network 10. Said packing may be effected by the second output interface 122 and may, again, comprise packing the data item into a suitable protocol. The update message 21 is received on the client side 12 by a second input interface 222 and is subsequently incorporated into the client side data carousel 32. In this way, the client side data carousel 32 is constructed nearly isochronous to the server side carousel 31, and such a construction may be conducted on the client side 12 as being directly invoked by the application 110 on the server side 11. However, failed updates of the client side carousel 32, which may not arrive at the client side 12 due to, for example, interruptions of the respective communication channel carrying the update message 21, may still be leveled out by the base carousel update mechanism.

A client access interface 220 may provide data access to the client side data carousel 32 by applications 210. Further, the application 210 may be notified via the client access interface 220 when an update message 20, 21 has been received from the server side 11 and/or has been incorporated into the client side data carousel 32. In this way, the application 210 may be, without delay, aware of an updated data item in the client side data carousel 32 or an updated data carousel 32 as a whole.

According to this embodiment of the present invention, the update message 20 is being sent from the server side 11 to the client side 12 over a first communication channel 101 of the communication network 10. Further, the update message 21 which carries the data update 2 with a least possible delay to the client side 12 is transmitted via a second channel 102 of the communication network 10 to the client side 12. Within the communication network 10, the second communication channel 102 may be provided with a higher priority than the first communication channel 101. Further, the second channel 102 may provide so called quality of service properties (QoS) which are better than the respective QoS properties of the first channel 101.

Said QoS properties may comprise figures such as a transmission reliability, an error rate, a transmission rate, a minimum bandwidth, or the like. In this way, the sending of the update message 21 over the second communication channel 102 may provided with an overall increased transmission speed and reliability with respect to a transmission over the first communication channel 101. This may be of additional advantage, since the transmission of a respective data update 2 via the update message 21 may always be conducted prior to a corresponding transmission of an update message via the first communication channel 101. According to this embodiment, the first and the second communication channels 101, 102 may be provided by a single communication network 10.

Figure 2B:
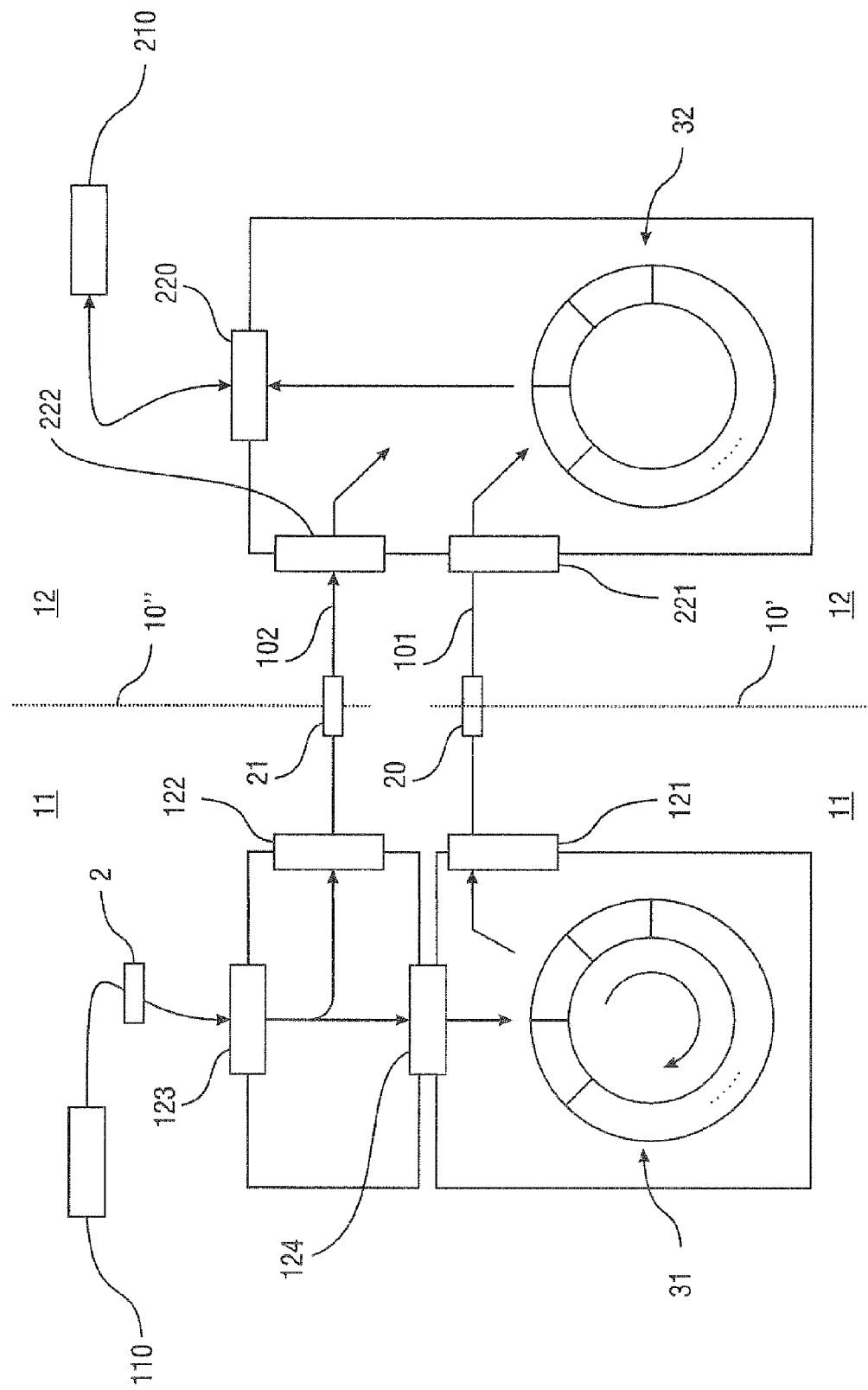

According to another embodiment of the present invention, which is shown as a schematic view in FIG. 2B, the first communication channel 101 and the second communication channel 102 may be provided by different communication networks, namely a first communication network 10' and a second communication network 10". In this way, the first communication network 10' may be based on a first communication technology, whereas the second communication network 10" may be based on a second communication technology. Said first and said second communication technologies may be selected from, for example, a GSM technology, a UMTS technology, a PCS technology, a WLAN technology, a WiMAX technology, an LTE technology, a radio or video broadcast technology, or a related technology.

In this way, the second communication channel 102 may be provided by a second communication technology which may provide a higher quality of service with respect to the first communication technology. In such a case, the first communication technology may involve an increased demand of network and/or computational resources with respect to the first technology. However, this increased demand may be tolerable, since only the time-critical immediate sending of the data updates—upon reception on the server side 12—to the client side 12 is conducted via the second communication channel 102. The repeated and, possibly, redundant sending of the update messages 20 (once for each revolution of the data carousel 31) is still conducted via the first communication channel 101 being based on the first communication technology. Said first technology demand less resources and is, thus, compatible to the repeated and redundant sending.

According to another embodiment, the first communication channel 101 may be a channel of the first communication network 10' which is a conventional carousel based information broadcast system network, such as an RDS-TMC or a DVB/DAB-TPEG technology based network. The second channel 102 may be, however, a channel of the second network 10", which is a higher-bandwidth network. In this case the second communication channel 102 may be an MBMS channel of a cellular network, hence, providing a far enhanced QoS for the immediate sending of the data updates with respect to the repeated sending via the, for example, RDS-based first network 10'.

Figure 2C:
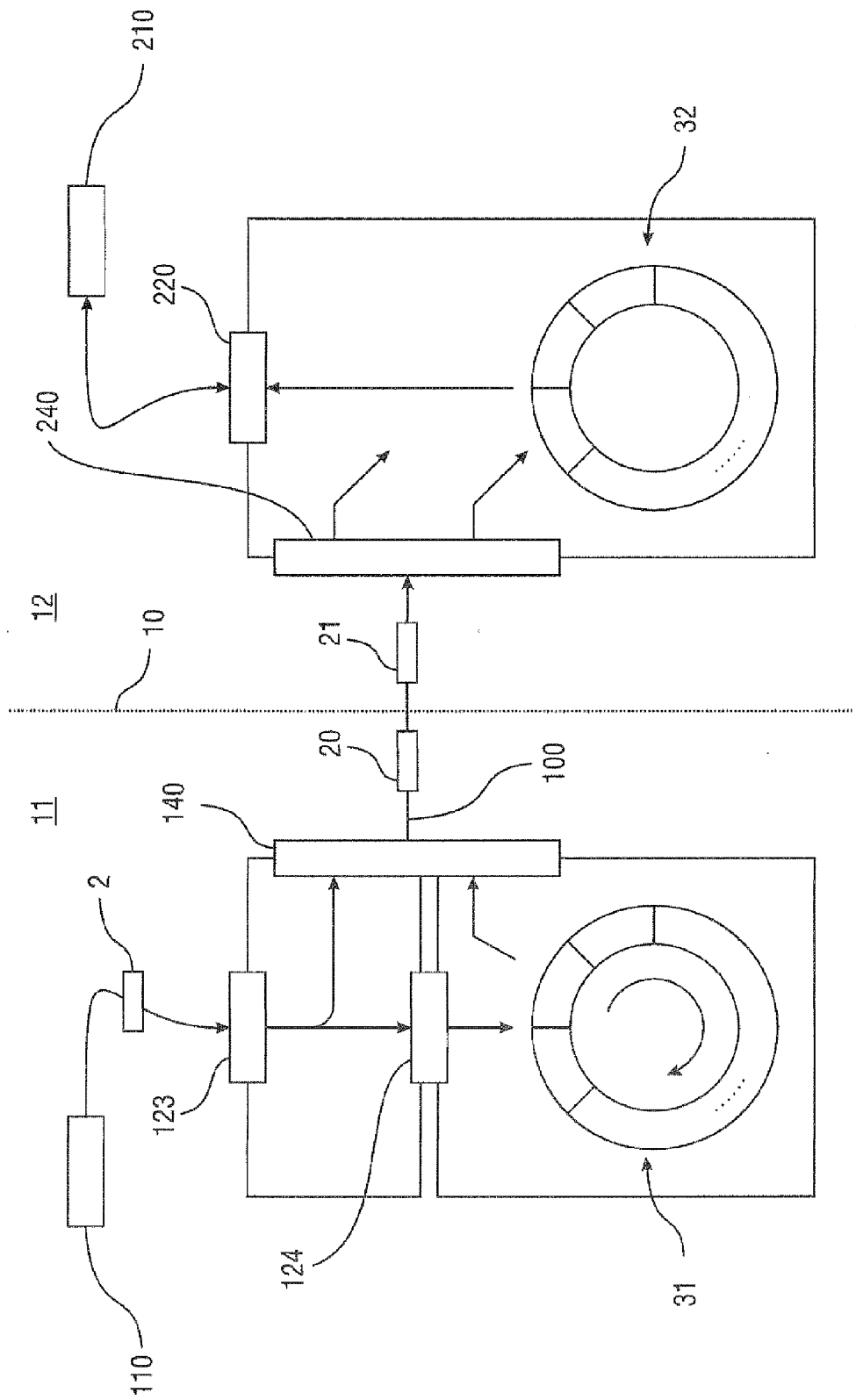

FIG. 2C shows a communication system according to another embodiment of the present invention. Accordingly, both the update message 20, being associated with sending a data item being stored in the current data slot of the server side data carousel 31, and the update message 21, being associated with an immediate and independent sending of an incoming data update 2, are being sent over a common communication channel 100 of the communication network 10.

For this purpose, there may be provided a server side multiplexer 140 and a client side de-multiplexer 240. The multiplexer 140 may multiplex the update message 20 as well as the update message 21, such that they are suitable for being transmitted over the single communication channel 100. The multiplexer 140 may, further, handle the update message 21, associated with an immediate and independent sending of the data update 2 to the client side 12, with a higher priority with respect to sending the update message 20, being associated with the current data slot of the server side data carousel 31.

In this way, as shown in FIG. 2C, the multiplexer 140 may send the update message 21 over the communication channel 100 prior to sending the update message 20, even if there is an update message 20 being ready for being transmitted to the client side 12. Such a prioritized transmission may comprise a preemptive access to the communication channel 100 by the multiplexer 140 in order to achieve a comparable prioritization of sending the update message 21 with respect to the described embodiments of the present invention that provide two separate communication channels.

Figure 3B:
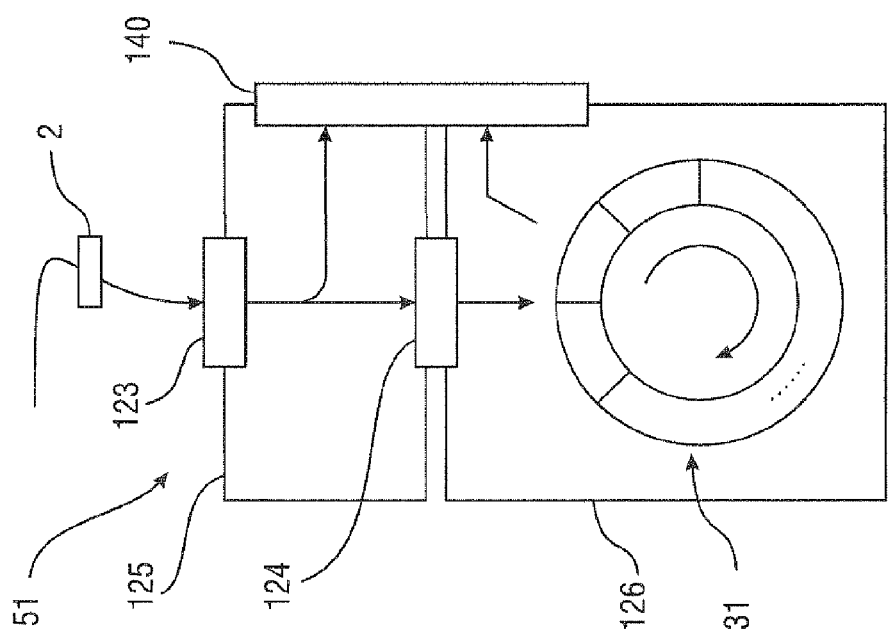
FIGS. 3A and 3B show schematic views of server entities according to further embodiments of the present invention.
Figure 3A:
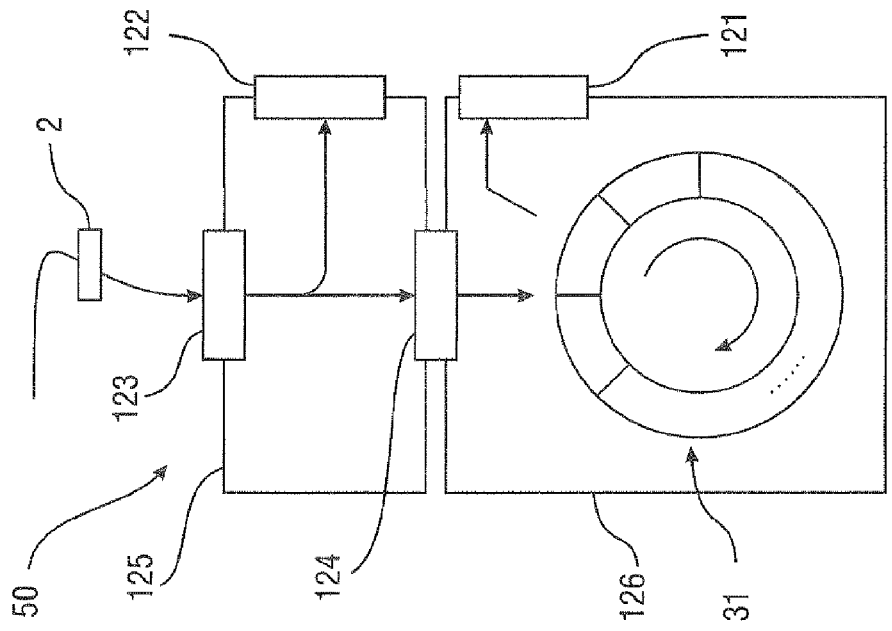

FIG. 3A shows a schematic view of a server entity 50 according to another embodiment of the present invention. The server entity 50 comprises the server access interface 123 for receiving a data update 2, the further server access interface 124, as well as the first output interface 121 and the second output interface 122. Further, the server entity comprises a duplicating section 125, which provides the data update 2 to the further server interface 124 and the second output interface 122, on of these provided updates being possibly a data update duplicate.

The server entity 50 further comprises a data carousel section 126, which comprises and/or runs the server side data carousel 31. Said data carousel section 125 receives the data update 2 by the further server access interface 124 and handles the storage and incorporation of the data update 2 into the data carousel 31. The data carousel section 125 further handles the data carousel 31 itself, such handling comprising an identifying of one of the data slots of the data carousel 31 as a current data slot 310, switching the current data slot to a next data slot after the predetermined time span has elapsed, adding and removing data slots to and from the carousel 31, and passing data items being stored in the current data slot to the first output interface 121.

The server entity 50 may be embodied as any server entity, such as a distinct data processing apparatus being suitable for embedding into a communication network and/or a core network thereof. The server entity 50 may as well be realized as a software module running on one or more distributed data processing apparatuses being coupled to the respective communication network.

FIG. 3B shows a server entity 51 according to another embodiment of the present invention. Accordingly, the server entity 51, in contrast to the server entity 50 as being described in conjunction with FIG. 3A, comprises the multiplexer 140, which is suitable for passing both the data update 2 as well as a data item from the data carousel 31 to the client side over one single communication channel and for sending both the first update message 20 and the second update message 21 over a common single communication channel. The multiplexer 140 may incorporate the functionalities being associated with providing messages which are suitable for being transmitted over a communication channel, i. e. the functionalities of output interfaces. In a way, the multiplexer 140 may form or comprise the first output interface 121 and/or the second output interface 122, as they were described in conjunction with FIGS. 2A, 2B, and 3A.

In general, a server entity according to an embodiment of the present invention may be a server apparatus, a data processing apparatus, a personal computer, a computer, a mainboard computer, an embedded or a distributed system, or the like, on which the data carousel and the corresponding update mechanism, as they have been described in conjunction with an embodiment of the present invention, are implemented. Such an implementation may be effected by means of respective software components running on one or more microprocessors of such a server entity or by a dedicated hardware implementation, such as integrated circuit or a so-called application specific integrated circuit (ASIC).

Figure 4B:
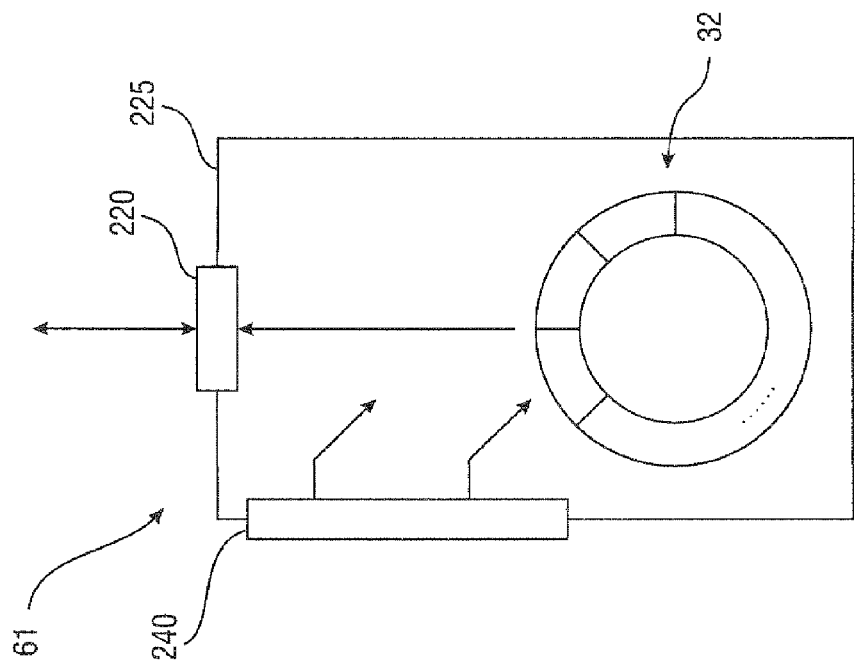
FIGS. 4A and 4B show schematic views of client entities according to further embodiments of the present invention.
Figure 4A:
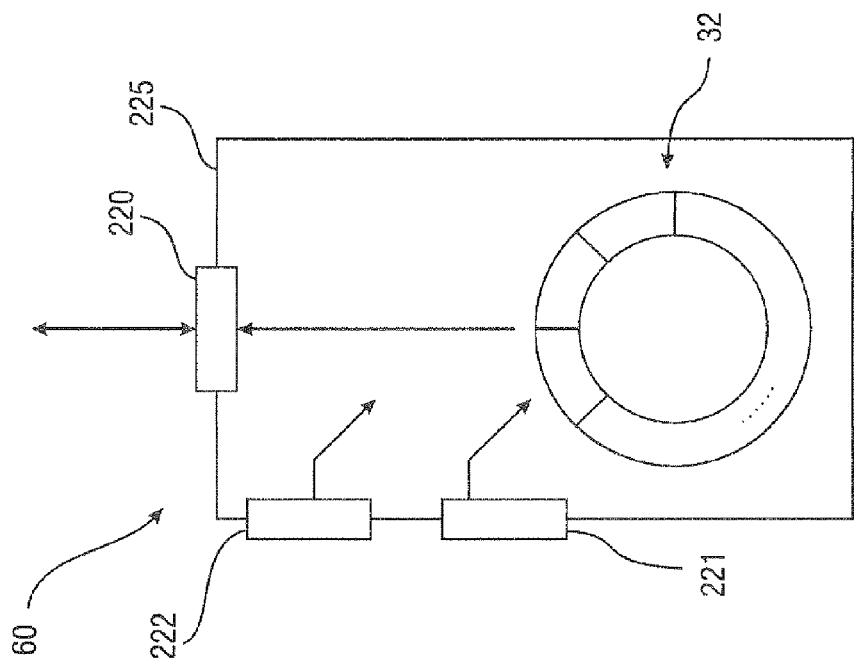

FIG. 4A shows a schematic view of a client entity according to another embodiment of the present invention. Accordingly, a client entity 60 comprises the first input interface 221 and the second input interface 222. The client entity 60 may receive a first update message from the first input interface 221 via a first communication channel, as well as a second update message from the second input interface 221 via a second communication channel. The client entity 60 may incorporate both received update messages into the client side data carousel 32.

The client entity 60 may further be configured such to incorporate the data update being received from the second input interface 222 with a higher priority into the data carousel 32 than incorporating an update message being received from the first input interface 221. The client entity 60 may further comprise a carousel section 225 which stores and handles the client side data carousel 32. Additionally, the client entity 60 comprises the client access interface 220 for handling access to the client side data carousel 32 and/or for providing data from and/or notifications of an update of the client side data carousel 32.

FIG. 4B shows a client entity according to another embodiment of the present invention. The client entity 61 comprises the de-multiplexer 240 for receiving update messages via one single common communication channel. The de-multiplexer 240 may further pass an update message, being associated with an immediate and independent sending of an incoming data update 2 on the server side, to the data carousel section 225 of the client entity 61 for a prioritized incorporation into the data carousel 32.

In general, a client entity according to an embodiment of the present invention may be a mobile terminal, a mobile phone, a personal digital assistant (PDA), a handheld or a car navigation system, a portable personal computer, and the like, on which a data carousel and the corresponding update mechanism, as they have been described in conjunction with an embodiment of the present invention, are implemented. Such an implementation may be effected by means of respective software components running on a microprocessor of such a client entity or by a dedicated hardware implementation, such as integrated circuit or a so-called application specific integrated circuit (ASIC).

Figure 5:
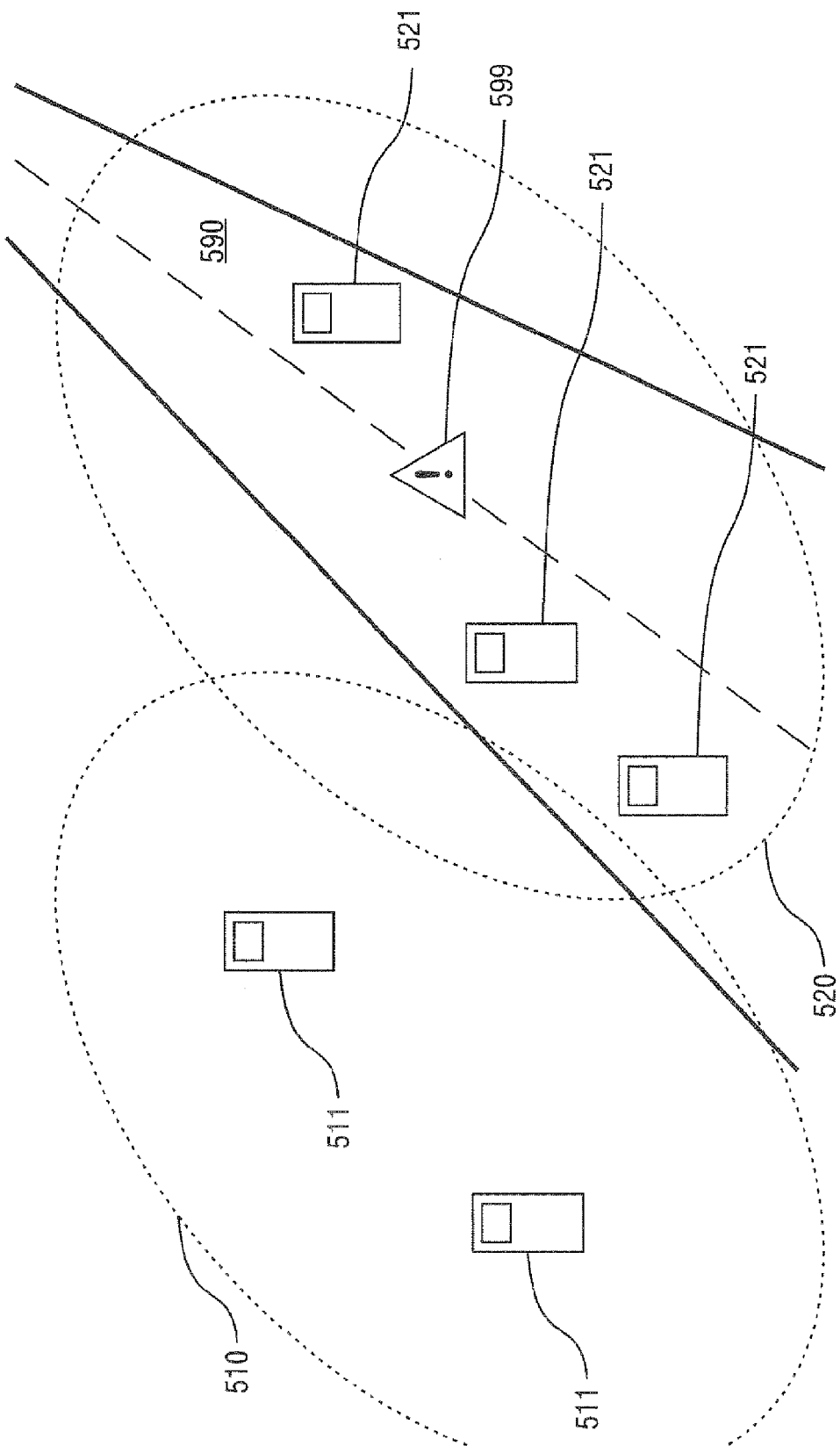
FIG. 5 shows a schematic view of an application of providing data to clients according to another embodiment of the present invention.

FIG. 5 shows a schematic view of an application of providing data to clients according to another embodiment of the present invention. Said application may provide data to a plurality of client entities. In the context of the depicted arrangement, the client entities are or comprise mobile terminals such as mobile phones and/or car navigational systems. Said mobile terminals are, according to this embodiment, arranged in a first group of first mobile terminals 511, and a second group of mobile terminals 521.

According to the shown arrangements, the mobile terminals 521 are arranged in a second area 520, which substantially overlaps with a road 590. A second area 510 may be substantially different from said second area 520 and may only overlap for its smaller part with the second area 520 and may only cover a negligible area or part of the road 590. In said first area 510 there are arranged the mobile terminals 511. In general, the mobile terminals 511, which are arranged inside the first area 510 may not be assumed to be located on the road 590 and/or may be assumed not being affected by occurrences on the road 590 or in association with the road 590. However, the mobile terminals 521 being arranged inside the second area 520 may be assumed as being well being affected by an occurrence 599 on the road 590 or in association with the road 590.

For example, the occurrence 599 may represent an approaching emergency vehicle, a traffic jam, an accident, a moving road works vehicle, road works, a slippery road condition, and the like. Vehicles moving on the road 590 and approaching the occurrence 599 and having the mobile terminals 521 on board can in principle be informed of the occurrence 599 such to take appropriate action, as reducing speed or using a deviation for example. Such an application requires a prompt passing of traffic messages with high time constraints informing about the occurrence 599 and should be broadcast to a maximum number of mobile terminals 521 in the second area 520. In such an application, a data update which needs to wait the entire revolution time of a server side carousel or a fraction thereof may arrive at the clients too late and quickly becomes obsolete although being provided in time on the server side.

According to this embodiment, only the client entities 521 in the second area 520 may be provided with a prioritized update message as described in conjunction with an embodiment of the present invention. By means of such a so-called geo-casting, a maximum number of selected clients may be provided with important data items, like road traffic hazard warnings, while, at the same time, no synchronous communication system is required. Such geo-casting may be effectively realized by using the MBMS technology and widely deployed cellular systems.

In any way, by means of sending data updates to the clients according to an embodiment which has been described in conjunction with the present invention, it is possible to realize near-time road traffic information services in cellular networks. A reduction of message transmission delays may be achieved by avoiding the delay of a first transmission cycle over the server side carousel. All following transmission cycles may only add accuracy and improve reliability or serve clients that are joining the communication system or are entering a respective area, such as the second area 520.

FIG. 6 shows a schematic view of a communication system according to another embodiment of the present invention. Accordingly, the communication system comprises a server side 611, a communication network 610, and a plurality of mobile terminals 612. Said mobile terminals 612 may be or comprise mobile phones or car navigation systems, which are, in turn, subscribers to a cellular communication network, such as a PCS network, a GSM network, a UMTS network, an LTE network, or another related telecommunications network.

According to this embodiment, the communication network equipment 610 comprises radio service equipment 613 which provide wireless connection and communication to the mobile terminals 612. Such radio service equipment 613 may comprise, for example, a radio base station providing a cell of a cellular communication network. Further, said plurality of mobile terminals 612 may be arranged inside one of such cells or within an area which is defined in geographical terms comprising more than one cell, such as the first or second area 510, 520 as those were described in conjunction with FIG. 5.

On the server side 611 a first server apparatus 616 runs a serving application, a second server apparatus 615, and a broadcast service apparatus 614. Said second server apparatus 615 may be or comprise a server entity which has been described in conjunction with an embodiment of the present invention. Even if said first server apparatus 616, said second server apparatus 615, and said broadcast service apparatus 614 are depicted as distinct units, their respect functionalities may be well integrated in one data processing apparatus running respective software modules, or they may well be distributed to more than the depicted data processing apparatuses within equipment that provides and/or is associated with providing service of a cellular or telecommunications network.

According to this embodiment, the first server apparatus 616 runs the serving application that may provide a first data update 6001, a second data update 6002, and a third data update 6005. Said data updates 6001, 6002, and 6005 are passed to the second server apparatus 615 which incorporates the received data updates into a server side data carousel and provides also, immediately and independent from said data carousel, corresponding update messages 6011, 6012, and 6015 to the broadcast service apparatus 614, which, in turn, provides a corresponding message 6021, 6022, and 6025, which are suitable for being transmitted over the network 610 to the mobile terminals 612.

However, the data carousel of the second server apparatus 615 provides further update messages 6013, 6014, and 6016 that are associated with data items already being stored on the data carousel, even or exactly when the serving application on the first server apparatus 616 does not provide data updates.

At the instance when the serving application running on the first server apparatus 615 has completed the sending of the update message 6014 and would be ready to send an update message 6016 which associated with a next data item being stored in the carousel, the first server apparatus 616 provides the data update 6005. Since forwarding of such a data update has priority, the scheduled transmission of data items being stored in the data carousel of the second server apparatus 615 is interrupted, and the data update 6005 is incorporated into the data carousel and, immediately and independent from the data carousel, passed as the update message 6015 to the broadcast service apparatus 614, which, in turn, provides this update to the mobile terminals 612 as with the message 6025. Subsequently, the scheduled transmission of the next data item being stored in the next data slot of the data carousel may be sent to the mobile terminals 612 by the broadcast service apparatus 614 and update messages 6016, 6026.

According to another embodiment, the sequence may include an optional establishing of a connection and/or a communication session from the server side 611 to the mobile terminals 612. For this purpose, the second server apparatus 615 may initiate a start session command 6000, which results in an announcement 6010 being sent by the broadcast service apparatus 614 and which indicates to the mobile terminals 612 that a channel, a connection, and/or a communication session is available. The mobile terminals 612 may then still decide for themselves whether or not to join such a session and, consequently, whether or not to receive messages 6021 through 6026.

According to a further embodiment of the present invention, the server side 611 may be part of a cellular communication network and may provide the so-called multimedia broadcast and multicast service (MBMS) providing a broadcast mechanism to the mobile terminals 612. In this way, the broadcast service apparatus 614 and/or the second server apparatus 615 may be formed by or a part of an MBMS service.

Further, according to another embodiment of the present invention, said MBMS may employ one or more MBMS channels for sending data and update messages to the mobile terminals 612. In this way, a first MBMS channel may be a first communication channel which has been described in conjunction with an embodiment of the present invention, and a second MBMS channel may be a second communication channel as has been described in conjunction with an embodiment of the present invention. In the case that a second MBMS channel is used, the broadcast service apparatus 614 may initiate a second announcement, similar to the announcement 6010, to indicate to the mobile terminals 612 that there is a second session and/or channel available.

Further, according to another embodiment, the underlying MBMS transport service which facilitates the sending of the data and update messages to the mobile terminals 612 may be a transport mechanism, such as the so-called file delivery over unidirectional transport (FLUTE), a real time protocol (RTP) packet transport, such an RTP packet transport in streaming mode, or related mechanisms and protocols. For applications that exchange larger data items it may be preferable to apply said FLUTE transport mechanism, whereas for applications that exchange road traffic information services, which use commonly smaller data items, it may be preferable to use a streaming mode mechanism, such as the real time protocol Packet in streaming mode. In this context, larger data items may be data items that comprise more than one kilobyte of data, whereas, smaller data items may be data items that comprise less than one kilobyte of data.

Figure 7A:
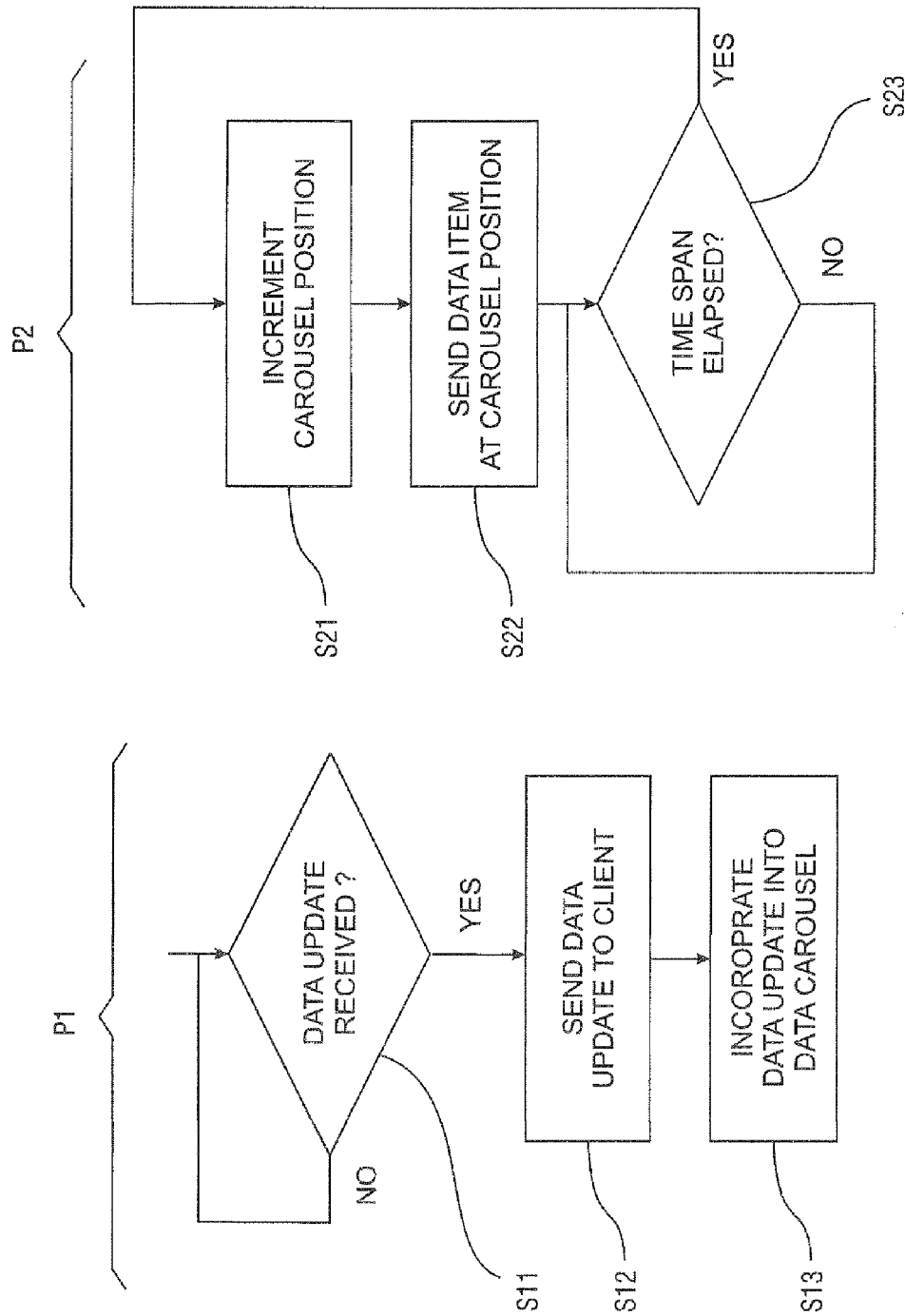
FIG. 7A shows a schematic flowchart of a method of providing data to a client by a server, according to another embodiment of the present invention.

FIG. 7A shows a schematic flowchart of a method according to another embodiment of the present invention. Said method comprises two processes, namely a first process P1 and a second process P2. Within the first process P1 a first step S11 is provided for determining whether a data update has been received. Once a data update is received, this data update is immediately and independent from a data carousel (see process P2) sent to the client in a step S12. Only then, after the update has been sent to the clients in step S12, said update is incorporated into the data carousel (S13).

A second process P2, which may be implemented with a lower priority than the first process P1, comprises a loop which carries out an increment step S21 and a sending step S22 repeatedly, each time a time span has elapsed (S23). Said increment step S21 increments a carousel position, hence, indicates a subsequent one of a plurality of data slots of the data carousel as a current data slot. The data item being stored in the current data slot at the recent carousel position is sent to the clients in step S22.

It is noted, that both processes P1 and P2 may be implemented on a data processing apparatus and with a higher execution and/or thread priority given to the first process P1. This implies that the first process P1, once a reception of a data update has been determined in step S11 may interrupt the second process P2 at any stage. For example, when in the second process P2 the carousel position has been just incremented in step S21, the second process P2 may be interrupted, and at least the sending of the received data update in step S12 is executed prior to the sending step S22 of the second process P2.

FIG. 7B shows a schematic flowchart of a method according to yet another embodiment of the present invention. This method depicts a method on a client side as has been described in conjunction with an embodiment of the present invention. Said method comprises a third process P3 and a forth process P4.

The third process P3 comprises a first step S31 which decides whether or not a high priority update message has been received from the server side. This may attained by a dedicated high priority communication channel. Once a high priority data update has been received, said data update is incorporated into a client side data carousel in step S32. Optionally, a notification is sent out to applications running on the client side that the data carousel has been updated in a notification step S33. Even if the order has been depicted such that the notification step S33 is executed after the incorporation step S32, applications or a client entity may well require that a notification of having received a high priority data update is to be forwarded immediately, or with a least possible delay, to client side applications, said order may be well other way round, i.e., the notification step S33 may be executed prior to the incorporation step S32.

As a second process on the client side, the fourth process P4 is executed, which comprises a determining step S41, which determines whether or not a data update has been received. If a data update has been received, said data update is incorporated into the client side data carousel in an incorporation step S42. Again, such incorporation may initiate an optional notification step S43 in which a corresponding update notification is passed to applications running on the client side.

It is noted, that both processes P3 and P4 may be implemented on a data processing apparatus on the client side and on a data processing device, such as a microprocessor of a mobile terminal. Said third process P3 may be given a higher execution and/or thread priority with respect to the fourth process P4. This implies that the third process P3, once a reception of a high priority data update has been determined in step S31 may interrupt the fourth process P4 at any stage.

The preceding description only describes exemplary embodiments of the invention. The features disclosed therein and the claims and the drawings can, therefore, be important for the realization of the invention in its various embodiments, both individually and in any combination. While foregoing is directed to embodiments of the present invention, other and further embodiments of this invention may be devised without departing from the basic scope of the invention, the scope of the present invention being determined by the claims that follow.

The invention claimed is:

1. A method implemented by a data distribution server device configured to provide data comprising a plurality of data items to a client, the method comprising:
   receiving a data update for updating a revolving data carousel that holds said data items;
   incorporating the data update into the revolving data carousel;
   sending a data item on the data carousel to the client on a first communication channel; and sending a duplicate of the data update to the client on a second communication channel that is distinct from the first communication channel.

2. The method of claim 1, wherein the data update applies to the data item sent to the client on the first communication channel, and wherein the duplicate of the data update is sent to the client prior to sending the data item to the client.

3. The method of claim 1, wherein sending the duplicate of the data update to the client is independent from sending the data item to the client.

4. The method of claim 1, further comprising judging whether or not the received data update is time-critical and withholding sending of the duplicate of the data update if the data update is not time-critical.

5. The method of claim 1, wherein the first communication channel is provided by a first communication network that is based on a first communication technology, wherein the second communication channel is provided by a second communication network that is based on a second communication technology, and wherein said first communication technology is different from said second communication technology.

6. The method of claim 1, wherein the second communication channel provides a higher quality of service than the first communication channel.

7. The method of claim 1, wherein a communication channel is an asynchronous communication channel.

8. The method of claim 1, further comprising establishing communication between the data distribution server device and the client.

9. The method of claim 1, wherein incorporating the data update into the revolving data carousel comprises:
adding a first slot to a plurality of slots of the revolving data carousel, the plurality of slots storing the plurality of data items;
modifying a data item stored in a second slot of the plurality of slots of the revolving data carousel; or
removing a third slot from the plurality of slots of the revolving data carousel.

10. The method of claim 1, further comprising cyclically determining, for each of a plurality of slots of the data carousel, whether to transmit a data item stored in the slot of the data carousel.

11. The method of claim 1, wherein incorporating the data update into the revolving data carousel comprises updating memory circuitry of the data distribution server in which the revolving data carousel is stored.

12. A data distribution server device configured to provide data comprising a plurality of data items to a client, comprising:
an access interface configured to receive a data update for updating a revolving data carousel that holds said data items;
a data carousel circuit configured to incorporate the data update into the revolving data carousel;
an output interface configured to send a data item on the data carousel to the client on a first communication channel, and
a duplicating circuit configured to send a duplicate of the data update to the client on a second communication channel that is distinct from the first communication channel.

13. The data distribution server device of claim 12, wherein the data update applies to the data item sent to the client on the first communication channel, and wherein the duplicating circuit is configured to send the duplicate of the data update to the client prior to the output interface sending the data item to the client.

14. The data distribution server device of claim 12, wherein the duplicating circuit is configured to send the duplicate of the data update to the client independent from the output interface sending the data item to the client.

15. The data distribution server device of claim 12, further comprising a scheduling circuit configured to judge whether or not the received data update is time-critical and wherein the duplicating circuit is configured to withhold sending the duplicate of the data update if the data update is not time-critical.

16. The data distribution server device of claim 12, wherein the first communication channel is provided by a first communication network that is based on a first communication technology, wherein the second communication channel is provided by a second communication network that is based on a second communication technology, and wherein said first communication technology is different from said second communication technology.

17. The data distribution server device of claim 12, wherein the second communication channel provides a higher quality of service than the first communication channel.

18. The data distribution server device of claim 12, wherein a communication channel is an asynchronous communication channel.

19. The data distribution server device of claim 12, wherein the data distribution server device is configured to establish communication between the data distribution server device and the client.

20. A non-transitory computer readable medium storing a computer program product comprising computer program code that, when executed by a processor of a data distribution server device, causes the data distribution server device to provide data comprising a plurality of data items to a client, the computer program code further causing the data distribution server device to:
receive a data update for updating a revolving data carousel that holds said data items;
incorporate the data update into the revolving data carousel;
send a data item on the data carousel to the client on a first communication channel; and
send a duplicate of the data update to the client on a second communication channel that is distinct from the first communication channel.

* * * * *